United States Patent
Ford et al.

(10) Patent No.: US 7,407,183 B2
(45) Date of Patent: Aug. 5, 2008

(54) DRIVER SIDE AIR BAG MODULE WITH ANNULAR AIR BAG AND CENTRALLY DISPOSED CONTROL MODULE

(75) Inventors: Brian C. Ford, Mt. Clemens, MI (US); Lawrence R. Langbeen, Attica, MI (US); Mohannad F. Murad, Troy, MI (US); Hossam Almasri, Sterling Heights, MI (US); Randal Gosk, Troy, MI (US); John M. Burdock, St. Clair Shores, MI (US)

(73) Assignee: Key Safety Systems, Inc, Sterling Heights, MI (US)

( * ) Notice: Subject to any disclaimer, the term of this patent is extended or adjusted under 35 U.S.C. 154(b) by 0 days.

(21) Appl. No.: 11/071,943

(22) Filed: Mar. 4, 2005

(65) Prior Publication Data
US 2005/0146119 A1    Jul. 7, 2005

Related U.S. Application Data

(60) Division of application No. 10/280,150, filed on Oct. 25, 2002, now Pat. No. 6,863,301, and a continuation-in-part of application No. 10/210,248, filed on Aug. 1, 2002, now Pat. No. 6,994,372, which is a continuation-in-part of application No. 09/870,906, filed on May 31, 2001, now Pat. No. 6,550,804.

(60) Provisional application No. 60/271,133, filed on Feb. 23, 2001.

(51) Int. Cl.
*B60R 21/203* (2006.01)

(52) U.S. Cl. .................................... 280/731; 280/728.2

(58) Field of Classification Search .............. 280/728.3, 280/728.2, 731, 771; 74/552; 200/61.54, 200/61.55, 61.57
See application file for complete search history.

(56) References Cited

U.S. PATENT DOCUMENTS

| | | | |
|---|---|---|---|
| 3,618,979 A | 11/1971 | Gulette | |
| 3,819,203 A | 6/1974 | Radke et al. | |
| 3,831,973 A | 8/1974 | Meacham | |
| 4,797,538 A | 1/1989 | Schick | |
| 4,828,286 A | 5/1989 | Föhl | |
| 5,125,682 A | 6/1992 | Hensler et al. | |
| 5,190,313 A | 3/1993 | Hickling | |
| 5,253,892 A | 10/1993 | Satoh | |
| 5,312,129 A * | 5/1994 | Ogawa | 280/728.2 |

(Continued)

FOREIGN PATENT DOCUMENTS

DE         19742506 A1    4/1999

(Continued)

*Primary Examiner*—Ruth Ilan
(74) *Attorney, Agent, or Firm*—Markell Seitzman (57) ABSTRACT

An air bag module (20) having a base plate (30) and a toroidal air bag (80) is disclosed. The toroidal air bag (80) defines a pocket (120). The toroidal air bag (80) is coupled to the base plate (30). A control module (40) having a base plate portion (82) and a generally cylindrical portion (86) is coupled to the base and located within the toroidal air bag (80). The control module (40) has a control module cover (90) coupled to said generally cylindrical portion (86) disposed within said pocket (120).

4 Claims, 7 Drawing Sheets

U.S. PATENT DOCUMENTS

| | | |
|---|---|---|
| 5,439,247 A | 8/1995 | Kolb |
| 5,505,483 A * | 4/1996 | Taguchi et al. ............ 280/728.2 |
| 5,762,364 A * | 6/1998 | Cuevas ........................ 280/731 |
| 5,899,487 A * | 5/1999 | Fischer ..................... 280/728.3 |
| 5,927,754 A | 7/1999 | Patzelt et al. |
| 6,042,147 A | 3/2000 | Nishijima et al. |
| 6,050,597 A * | 4/2000 | Coleman .................... 280/731 |
| 2001/0035631 A1 * | 11/2001 | Hasebe .................... 280/728.2 |
| 2004/0021303 A1 * | 2/2004 | Ford et al. ............... 280/728.3 |

FOREIGN PATENT DOCUMENTS

| | | |
|---|---|---|
| DE | 19749914 A1 | 5/1999 |
| DE | 19904072 A1 | 8/2000 |
| DE | 19932696 C1 | 9/2000 |
| DE | 20010726 U1 | 10/2000 |
| DE | 20105002 U1 | 8/2001 |
| GB | 1 362 672 | 7/1971 |
| GB | 2 268 128 | 1/1994 |
| JP | 63301144 | 12/1988 |
| JP | 5-116581 A * | 5/1993 |
| JP | 986338 | 3/1997 |
| WO | WO 97/34783 | 9/1997 |

* cited by examiner

Fig. 9

DRIVER SIDE AIR BAG MODULE WITH ANNULAR AIR BAG AND CENTRALLY DISPOSED CONTROL MODULE

CROSS-REFERENCE TO RELATED APPLICATIONS

This application is a continuation-in-part application of prior U.S. patent application Ser. No. 10/210,248, filed Aug. 1, 2002, now U.S. Pat. No. 6,994,372. This application is also a divisional application of prior U.S. patent application Ser. No. 10/280,150, filed Oct. 25, 2002, now U.S. Pat. No. 6,863,301, which is a continuation-in-part application of U.S. patent application Ser. No. 09/870,906, filed May 31, 2001, now U.S. Pat. No. 6,550,804, which claims the benefit of U.S. Provisional Application No. 60/271,133, filed Feb. 23, 2001. The disclosures of U.S. patent application Ser. Nos. 10/280, 150, 09/870,906, and 60/271,133 are incorporated herein by reference.

FIELD OF THE INVENTION

The invention generally relates to driver side air bags and, more particularly to an air bag module having a toroidal air bag and center control module in a fixed relationship with a steering wheel.

BACKGROUND AND SUMMARY OF THE INVENTION

The typical driver side air bag module comprises a base plate, an inflator, an air bag and a cover. The base plate is mounted at or near the hub of the steering wheel; the inflator and air bag are located within the base plate and the cover protects the air bag. As the air bag inflates, the cover is broken apart thereby permitting the inflating air bag to expand. As can be appreciated, because the cover is a sacrificial part of the module it cannot be used to support permanent buttons, displays, switches and the like.

Another characteristic of the prior art construction is that on deployment, the expanding air bag is initially thrust directly toward the occupant, which may increase the level of forceful interference between the occupant and the expanding air bag. To restrict this forward motion, many prior art systems have resorted to the use of tethers, which attempt to control the trajectory of the expanding air bag.

It is an object of the present invention to provide an air bag module with a center control module that is fixed in relationship to the steering wheel and one in which the air bag and cover deploy about this fixed center control module. Consequently, an advantage of this construction is the fixed center control module can now support control or communication mechanisms and devices such as a horn switch, radio dials, cruise control buttons and even more complicated and expensive visual displays for a navigation system, including GPS satellite receiver display. These additional mechanisms and devices will be somewhat protected by the deployment of the air bag and may not need to be repaired when a new air bag module is installed or they can be reused in replacement air bag modules. In addition, this construction allows for additional or replacement mechanisms to be installed in the air bag module before it is deployed.

Another object of the invention is to provide a module in which the air bag is encouraged to initially fill radially due in part to the fixed center control module. Accordingly the invention comprises an air bag module having a base plate and a toroidal air bag defining an inner chamber. The toroidal air bag is coupled to the base plate. A control module having a base plate portion and a generally cylindrical portion is coupled to the base. The control module has a control module cover coupled to said generally cylindrical portion disposed within said inner chamber.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE DRAWINGS

Figure 1:
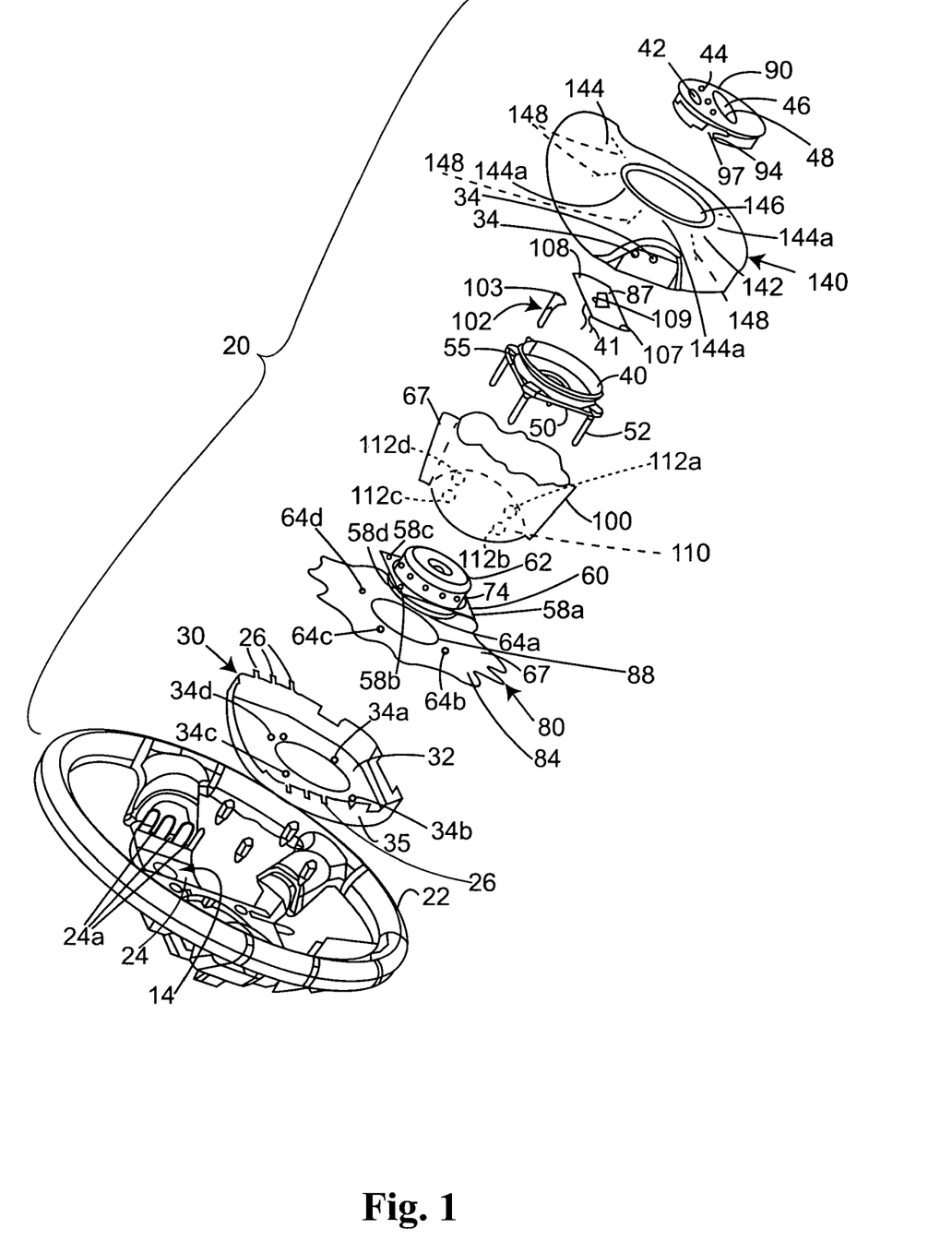
FIG. 1 is an exploded view showing a steering wheel and an air bag module incorporating the present invention.
Figure 2:
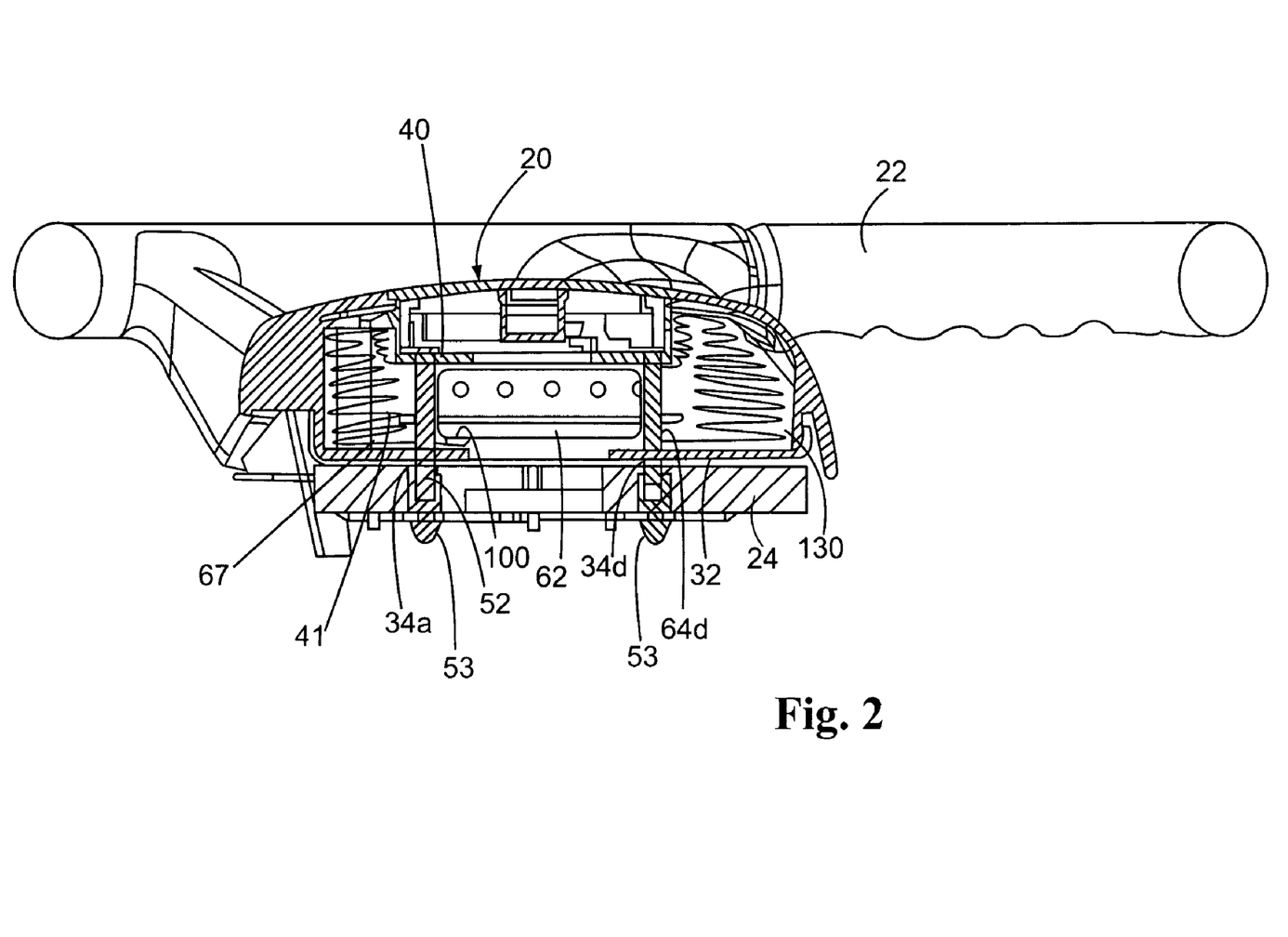
FIG. 2 is a cross-sectional view of an assembled module fastened to the steering wheel.
Figure 8:
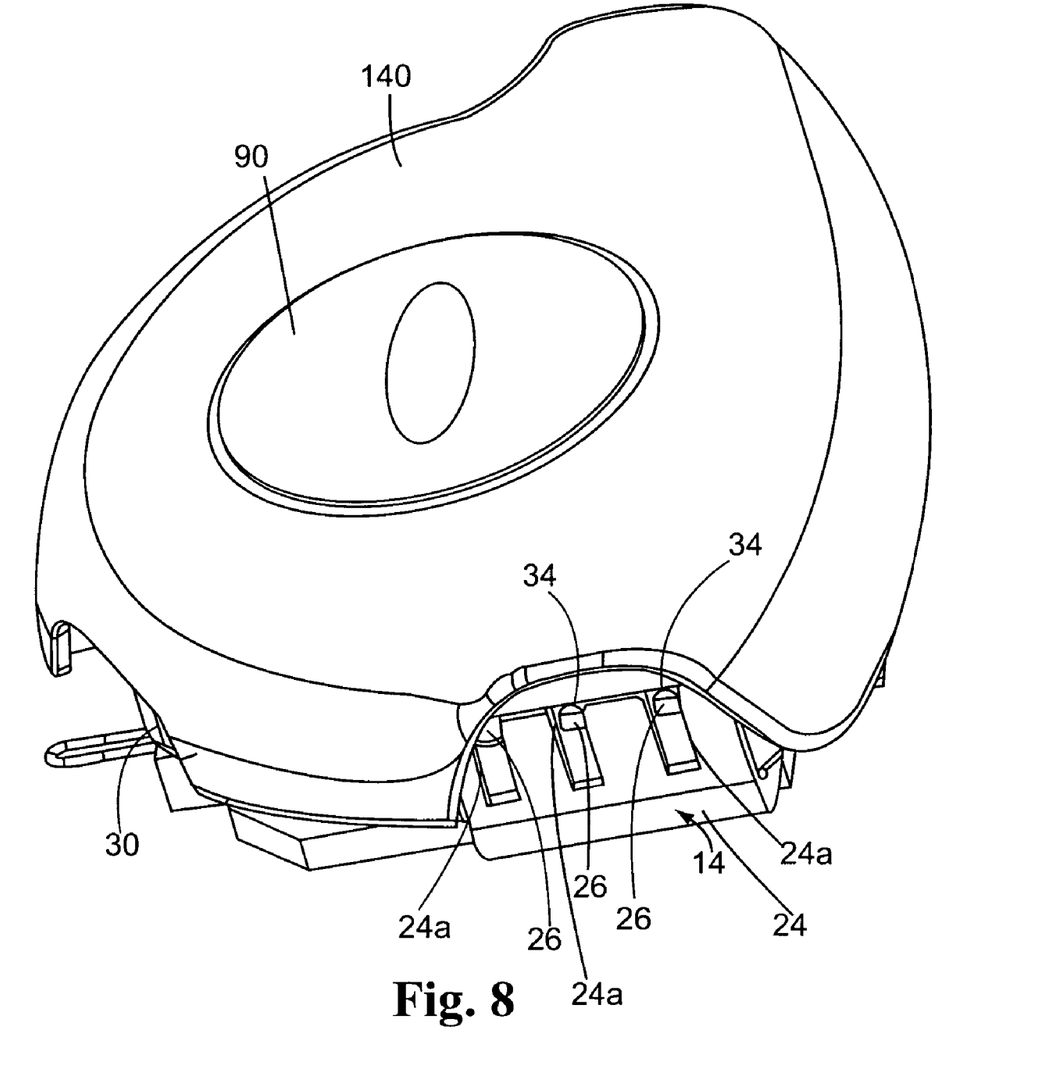
FIG. 8 is an isometric view of a module showing a portion of a steering wheel armature.

Reference is made to FIGS. 1, 2 and 8, which illustrate a driver side air bag module 20 and its various components. The module is adapted to be secured to a steering wheel 22 and more particularly to the hub 24 of the steering wheel. The module can be secured or attached to the steering wheel in any of many acceptable ways. The module 20 comprises a base plate 30 having a bottom 32. The base plate 30 can be flat or, for example, pie-shape in which case the base plate 30 will also include an upraised side wall or walls following the contour of the plate. As shown, the base plate 30 includes such an optional side wall 35. The bottom 32 includes a plurality of stud-receiving openings 34a-34d. The base plate 30 is received upon the center of the hub 24. The module 20 additionally includes a center (control) module 40. As shown, the center module 40 is circular but can be varied shapes. The module 40 may house signal conditioning electronics and also support one or more displays or mechanisms such as a horn switch 42, radio buttons 44, a navigation system 46 and its associated display 48, cruise control buttons (not shown), etc. Electric wires 41 carry signals to and from the control module. FIG. 8 shows a top isometric view of an air bag module 20 on a portion of the hub 24 with a representative informational device. The specific shape of the base plate, center module and cover will vary with each application. Generally, the sides of the base plate and cover will cooperate with the control module 40 to create a covered trough, which extends about the center module to receive the folded or compressed air bag. This trough may be circular, triangular, oval, etc. as dictated by performance and styling considerations and, of course, by the shape of the base plate, cover and control module 40.

A plurality of threaded mounting studs 52 extend from the bottom 50 of a base of the control module 40. These studs 52 extend through openings 58a-58d in the flange 60 of an inflator 62, as well as through various openings 64a-64d in the neck portion 67 of an air bag 80 (only a portion of the air bag is shown in FIG. 1). The studs 52 can also extend through the hub 24 of the steering wheel 22 as one means of fastening the module to the steering wheel 22. As can be seen in FIG. 2 the neck portion 67 of the bag is clamped between the inflator flange 62 and the base plate 30. As will be seen later, these studs 52 also extend through other openings in a top 110 portion of a fabric tube 100 (also see FIGS. 2 and 6), which is part of the air bag 80. This top portion is clamped between the top of the inflator 60 and the bottom of the control module 40. The inflator 60 includes a plurality of exit ports 74 through which inflator gas is communicated to the air bag.

Figure 3A:
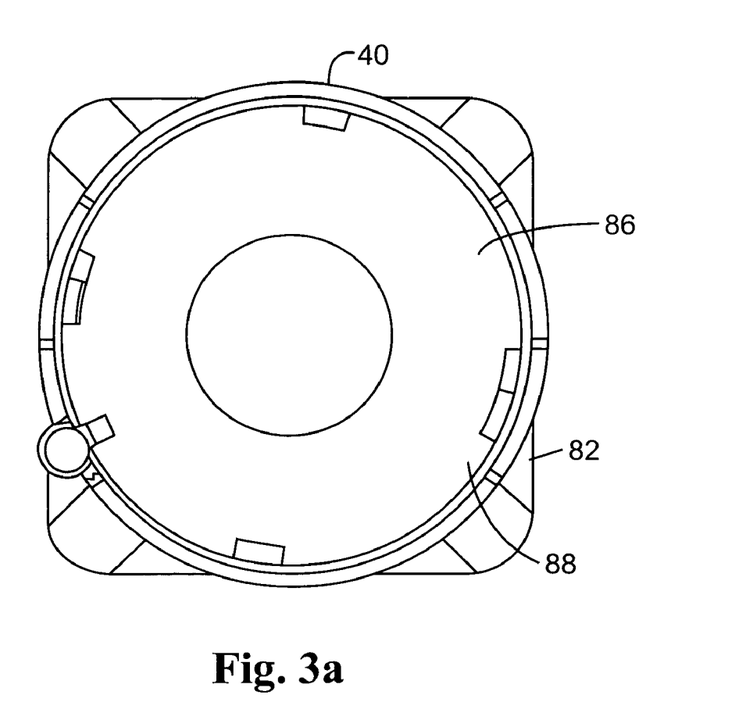
FIGS. 3A and 3B represent top and side views of the control module according to the teachings of the present invention.
Figure 3B:
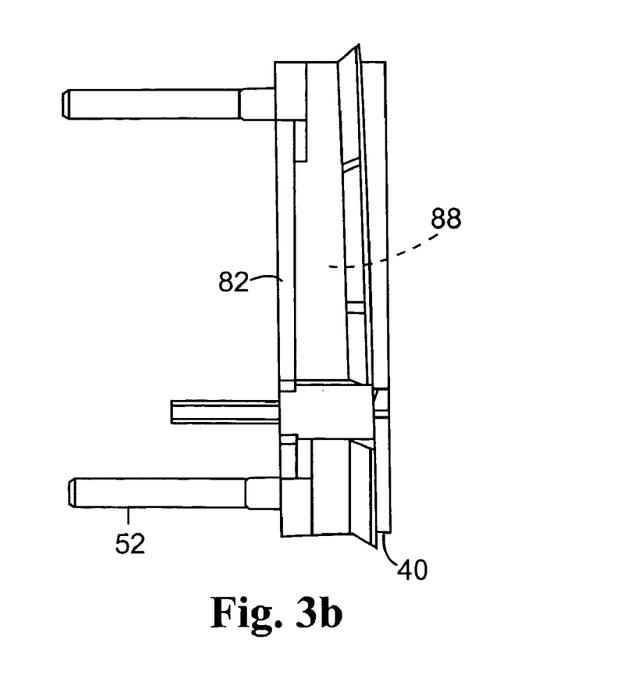
Figures 4, 7:
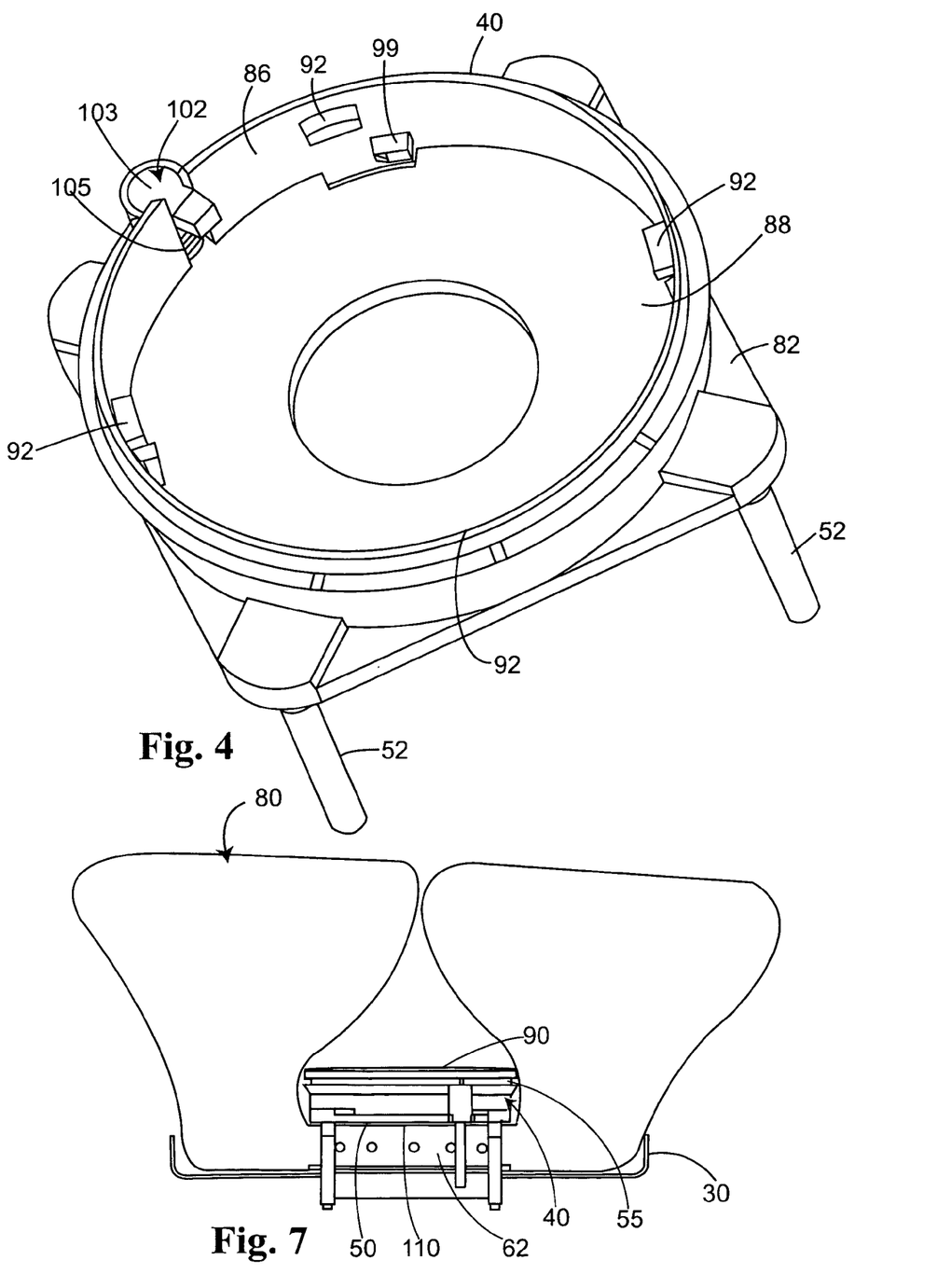
FIG. 4 represents a top perspective view of the control module shown in FIGS. 3A and 3B.
FIG. 7 is a cross-sectional view of an air bag module with an unfolded air bag extending radially outward.
Figure 5:
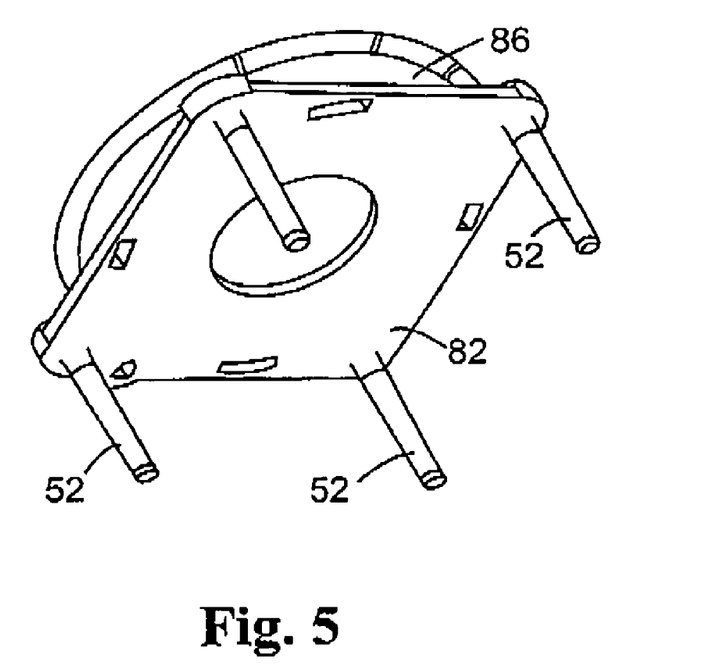
FIG. 5 represents a bottom perspective view of the control module shown in FIGS. 3A and 3B.

With general reference to FIGS. 3-5, which represent views of the control module 40 according to teachings of the present invention. The control module 40 has a generally square base 82, which supports the four coupling threaded mounting studs 52. Disposed upon the base is a generally cylindrical portion 86, which defines a chamber 88 that functions as a mounting location for electronic components 60 disposed therein. The cylindrical portion 86 further includes coupling mechanisms to couple cover 90 of the control module 40 to the control module base 82.

Figure 9:
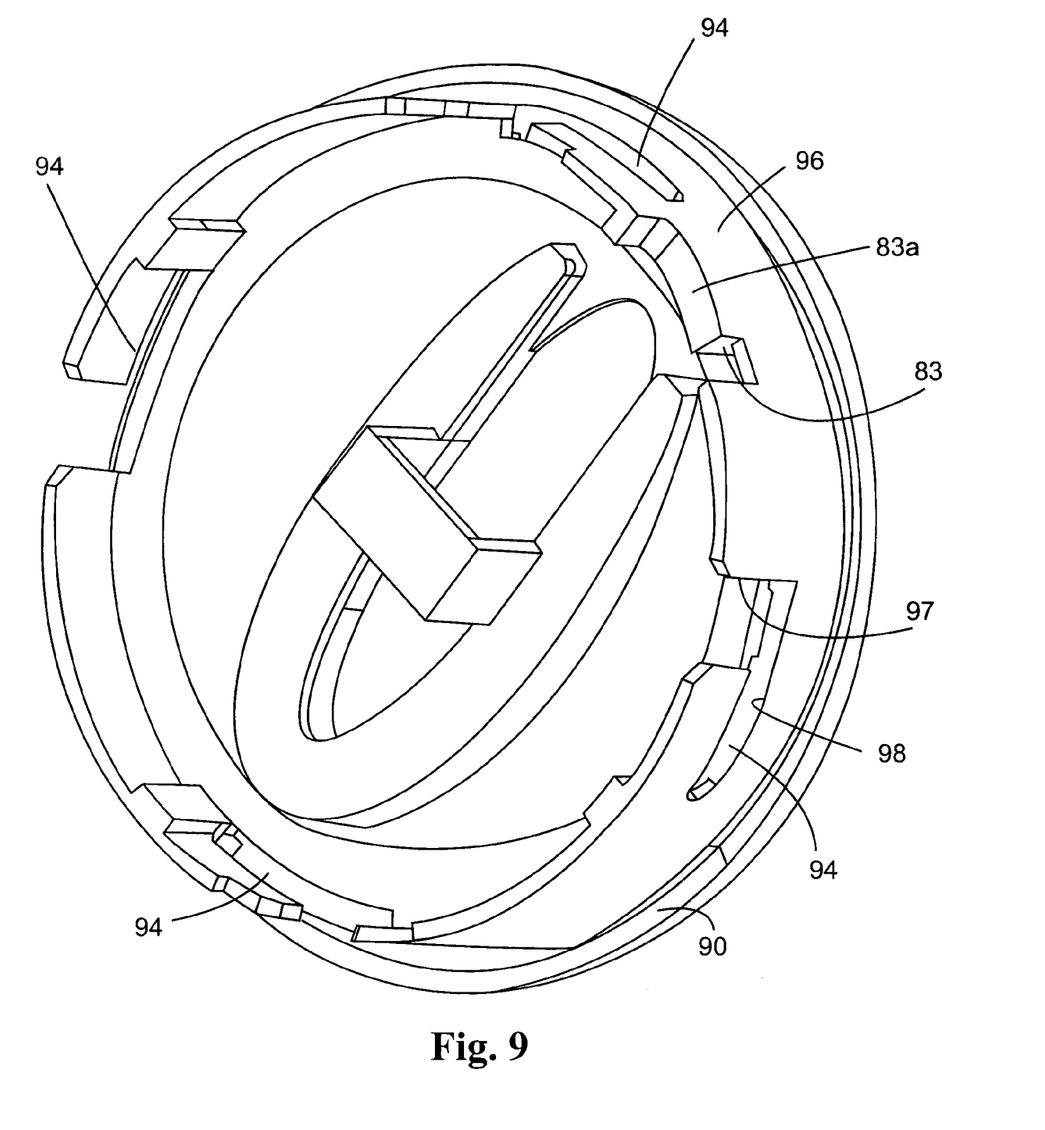
FIG. 9 represents the control module cover.

Disposed on an inner surface of the cylindrical portion 86 are a plurality of first locking flanges 92, which mate with a plurality of coupling slots 94 defined within a cylindrical portion or rim 96 of the control module cover 90 (see FIG. 9). Additionally, second locking flanges 99 are defined within the cylindrical portion 86, which slidably accept circuit boards 87 (see FIG. 1). The circuit boards 87 are deposited into the chamber 88 and fixed by rotation of the circuit board 87 beneath the second locking flanges 99. Optionally, the circuit boards can be coupled to the control module base with standard fasteners.

In this regard, the slots 94 defined in the cylindrical portion 96 of the control module cover 90 are generally L-shaped having a first portion 97, which accepts the vertical insertion of the locking flange 92. As the cover 90 is rotated about a central axis of the module 20, the locking flanges 92 are rotated into a second portion 98 of the L-shaped slots 94. As is best seen in FIG. 4, the control module 40 has an anti-rotation mechanism 102, which releasably locks into notches 83 disposed in the cylindrical portion of the control module cover 90. Preferably, one of the notches 83 defines a ramp 83a. The anti-rotation mechanism 102 is formed by a spring biased retractable member 103, which is biased in a locking position. The retractable member 103, which is disposed within a bore 105 defined within the base of the control module 40, can be retracted on the reverse side of the module 20.

The control module cover 90 can be removed by retracting the spring biased retractable member 103 and rotating the cover 90. In this way, electronics modules disposed within the control module 40 can be serviced without entirely disassembling the air bag module 20. It is envisioned the electronic modules can be a horn switch, a visual display, lights, a GPS, a cellular phone, vehicle gages, a radio, an occupant sensor, an anti-theft device 107, or any other device that will fit within the confines of the chamber 88.

The anti-theft device 107 envisioned would encompass a processor module 108 having a memory storage member, element, chip, IC 109. Upon the first coupling of the air bag module 20 to a vehicle's electrical system, the module 20 would interrogate a vehicle's computer (not shown) to retrieve a specific vehicle identity code. This vehicle identity code would be then stored in a memory 109 on the anti-theft device 107. Specifically, the stored code can only be changed if a specific, if not secret, clearing code is entered into the memory. Alternately, it is possible to use a non-updatable code, which requires the replacement of the computer chip on the control module, then giving out codes.

Upon startup of the vehicle, the processor 108 within the anti-theft device 107 would poll the vehicle to determine whether the vehicle identification code stored within its memory 109 is the same as the vehicle identification code of the vehicle. In situations where this is not the case, the control module 40 can display a message such as incompatible air bag module or stolen air bag module 20. Optionally, the air bag module 20 can produce an alarm signal or disable the ignition of the vehicle, or initiate some other action. It is envisioned the air bag module 20 would still deploy during a crash event.

Figure 6:
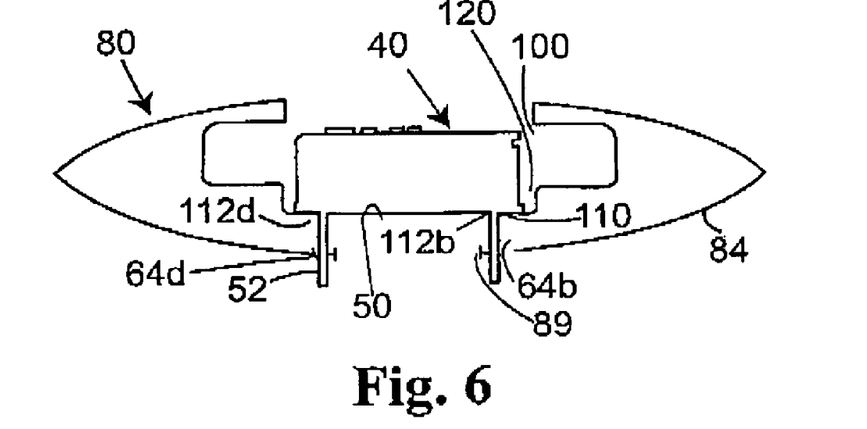
FIG. 6 is a cross-sectional view of the center control module within a toroidal air bag.

FIG. 6 (also see FIG. 2) represents the coupling of the control module 40 to the toroidal air bag. The studs 52 have been inserted through openings 112a-112d in the top panel 110 of tube 100. The top panel 110 now resides adjacent the bottom 50 of the control module 40. The control module 40 is shown within the pocket 120 formed by the now-inverted cylindrical portion or tube 100. Thereafter, the inflator is inserted through the neck opening 89 and is placed on the studs and moved upwardly to sandwich the top panel 110 against the bottom of the control module 40. Thereafter, the openings 64a-64d about the neck 67 of the rear panel 84 are manipulated over the studs 52. As can be seen, the neck of the rear panel lies adjacent the bottom of the inflator. Finally the base plate 30 is positioned on the studs sandwiching the neck portion of the rear panel against the flange of the inflator. The various parts of the module 20 can be secured in place by respective threaded nuts 53 to achieve the configuration as shown in FIG. 1. The same or different nuts or fasteners can be used to secure the base plate, inflator and control module to the steering wheel 22 as shown in FIG. 2.

Prior to folding the air bag 80 the air bag 80 is extended outwardly over the sides of the base plate 30. Subsequently, the air bag 80 is folded to reside within the annular space 130 between the interior surfaces of the base plate, the inflator and control module 40.

The air bag can be folded in a number of different ways. For example, the air bag can be extended radially from the base plate forming a circle and laid out flat. Thereafter, the air bag is folded in three accordion pleats, which generally resemble the sides of a triangle, reducing the partially folded shape to that of an equilateral triangle. Thereafter, additional accordion pleats are made in the points of the equilateral triangle and the folded parts are manipulated to fit within the space 130. Alternatively, the air bag can simply be pushed into the annular space 130.

Reference is again made to FIG. 1 as well as to FIG. 2, which show further details of the present invention. As can be seen, the control module 40 includes a peripheral groove 55, which is used to secure a center opening 146 of an air bag cover 140. After the air bag is folded, it is covered by the air bag cover 140 having an opening 146 for receiving the control module 90. In one embodiment, the air bag cover 140 comprises a cylindrical outer wall 142 with a flat annular top 144 having a center hole 146. The diameter of hole 146 is smaller than the diameter of groove 55 so that the opening 146 can slip within the groove and be secured thereby. In the preferred embodiment of the invention, the control module 40 is circular, however, shapes such as square or rectangular are within the scope of the present invention. The air bag cover 140 additionally includes a plurality of generally radial tear seams 148. As the air bag fills with inflation gas, the cover 140, proximate opening 146 is pulled out of the groove 55 and the cover tears along each tear seam 148, which permits each sector or segment 144a of the cover to move or petal outwardly permitting the air bag to exit about the open annular spacing between the now opened cover and the center module.

As shown in FIG. 8, the base plate 30 of the air bag module 20 retains the air bag (not shown). As also shown in FIG. 1, the base plate 30 has a plurality of radially extending flanges or tabs 26. The base plate 30 is preferably made from sheet metal such as stamped steel or aluminum. The flanges 26 are generally rectangular in shape, with a thickness of 1.5 mm and a width of 3 mm. The shape and dimensions may be varied as needed. Each flange 26 extends through a corresponding opening 34 in the air bag cover 140. The flanges 26 are designed to mate with the slots 24a of the steering wheel armature 14 in a snap fit. The snap fit of the flanges 26 into the slots 24a creates a structure which retains the air bag cover before, after and during deployment. In addition, the snap fit design simplifies the assembly of the air bag module 20 by eliminating the need for fasteners, such as rivets.

FIG. 9 represents the control module cover 90. Shown are the slots 94, which are generally L-shaped having a first portion 97, which accepts the vertical insertion of the locking flange 92. As the cover 90 is rotated about a central axis of the module 20, the locking flanges 92 are rotated into a second portion 98 of the L-shaped slots 94. Optionally, the slot 94 has a second portion, which can be "ramp" shaped.

Many changes and modifications in the above-described embodiment of the invention can, of course, be carried out without departing from the scope thereof. Accordingly, that scope is intended to be limited only by the scope of the appended claims.

What is claimed is:

1. A steering wheel assembly comprising:
   a base member (30) with at least one cover retaining flange (26);
   a cover (140) defining at least one retaining flange aperture (34) configured to receive at least one cover retaining flange (26);
   a steering wheel (14) having an armature (14), the steering wheel having at least one slot (24a) to receive the at least one cover retaining flange (26), wherein the cover (140) is disposed adjacent to the at least one cover retaining flange (26); and
   a control module (40) having a generally cylindrical portion (86) with a grooved portion coupled to an opening of the cover, the control module (40) having a control module cover (90) coupled to said generally cylindrical portion (86).

2. The steering wheel assembly of claim 1 wherein the steering wheel (14) includes a plurality of slots (24a), each slot (24a) configured to receive one cover retaining flange (26).

3. A steering wheel assembly comprising:
   a base member (30) having a plurality of retaining flanges (26);
   a steering wheel (14) having an armature (24), the steering wheel defining a plurality of slots (24a) for receipt of the flanges (26);
   a cover (140) including a plurality of retaining apertures (34), each retaining aperture receiving one retaining flange (26) therethrough; and
   at least one fastener extending through the base member linking the base member to the steering wheel; and
   a control module (40) having a base plate portion (82) and a generally cylindrical portion (86) coupled to the base plate portion (92), the control module (40) having a control module cover (90) coupled to said generally cylindrical portion (86);
   wherein said cover (140) is at least partially between said base plate 30 and said steering wheel armature (14).

4. The steering wheel assembly of claim 3 wherein the plurality of slots (24a) is located in the steering wheel armature.

* * * * *